United States Patent
Sugahara et al.

(10) Patent No.: US 12,296,321 B2
(45) Date of Patent: *May 13, 2025

(54) ORGANIC SUBSTANCE DECOMPOSITION CATALYST AND ORGANIC SUBSTANCE DECOMPOSITION APPARATUS

(71) Applicant: Murata Manufacturing Co., Ltd., Nagaokakyo (JP)

(72) Inventors: Nario Sugahara, Nagaokakyo (JP); Kentaro Ishihara, Nagaokakyo (JP); Akihiro Takeuchi, Nagaokakyo (JP); Hideto Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 720 days.

This patent is subject to a terminal disclaimer.

(21) Appl. No.: 17/554,388

(22) Filed: Dec. 17, 2021

(65) Prior Publication Data

US 2022/0105497 A1     Apr. 7, 2022

Related U.S. Application Data

(63) Continuation of application No. PCT/JP2020/016244, filed on Apr. 13, 2020.

(30) Foreign Application Priority Data

Jun. 26, 2019    (JP) ................................ 2019-118862

(51) Int. Cl.
    *B01J 23/78*     (2006.01)
    *B01J 23/00*     (2006.01)
          (Continued)

(52) U.S. Cl.
    CPC ............. *B01J 23/78* (2013.01); *B01J 23/002* (2013.01); *B01J 35/612* (2024.01); *B01J 35/613* (2024.01); *B01J 37/0045* (2013.01); *B01J 37/08* (2013.01)

(58) Field of Classification Search
    CPC ........ B01J 23/78; B01J 35/613; B01J 35/612; B01J 23/002; B01J 23/02; B01J 37/0045; B01J 37/08; C01P 2002/34; C01P 2002/74

(Continued)

(56) References Cited

U.S. PATENT DOCUMENTS

2020/0070130 A1    3/2020   Sugahara et al.
2020/0406236 A1   12/2020   Ishihara et al.
(Continued)

FOREIGN PATENT DOCUMENTS

CN        113797923 A   *   12/2021  ............ B01J 23/002
JP          05049943 A   *   3/1993  ............. B01D 53/86
(Continued)

OTHER PUBLICATIONS

Gallucci, K., et al.; "Catalytic combustion of methane on BaZr(1—x)Mex03 perovskites synthesised by a modified citrate method"; Catalysis Today, 2012, vol. 197, pp. 236-242.

(Continued)

*Primary Examiner* — Patricia L. Hailey
(74) *Attorney, Agent, or Firm* — ArentFox Schiff LLP

(57) ABSTRACT

An organic substance decomposition catalyst that contains a perovskite-type complex oxide denoted by a formula $A_xB_yM_zO_w$, where A includes Ba, B includes Zr, M represents Mn and Co, a composition ratio of Mn to Co is represented by Mn:Co=z1:z2, z=z1+z2, y+z=1.000, $0.100 \leq z1+z2 \leq 0.200$, $0.00 < z1/(z1+z2) < 0.75$, and w represents a positive value satisfying electrical neutrality.

12 Claims, 3 Drawing Sheets

(51) Int. Cl.
  *B01J 35/61* (2024.01)
  *B01J 37/00* (2006.01)
  *B01J 37/08* (2006.01)

(58) Field of Classification Search
  USPC .................................. 502/330, 525, 349, 340
  See application file for complete search history.

(56) References Cited

U.S. PATENT DOCUMENTS

| | | |
|---|---|---|
| 2020/0406245 A1 | 12/2020 | Mori et al. |
| 2021/0016259 A1 | 1/2021 | Kuretake et al. |
| 2021/0053030 A1 | 2/2021 | Kuretake et al. |

FOREIGN PATENT DOCUMENTS

| | | | | |
|---|---|---|---|---|
| JP | 2003117395 A * | 4/2003 | ............ | B01J 23/889 |
| JP | 6303834 B2 | 4/2018 | | |
| WO | WO-2014115573 A1 * | 7/2014 | .............. | B01J 23/34 |
| WO | 20190215951 A1 | 11/2019 | | |

OTHER PUBLICATIONS

International Search Report issued in PCT/JP2020/016244, dated Jun. 16, 2020.
Written Opinion of the International Search Report issued in PCT/JP2020/016244, dated Jun. 16, 2020.

* cited by examiner

ORGANIC SUBSTANCE DECOMPOSITION CATALYST AND ORGANIC SUBSTANCE DECOMPOSITION APPARATUS

CROSS REFERENCE TO RELATED APPLICATIONS

The present application is a continuation of International application No. PCT/JP2020/016244, filed Apr. 13, 2020, which claims priority to Japanese Patent Application No. 2019-118862, filed Jun. 26, 2019, the entire contents of each of which are incorporated herein by reference.

FIELD OF THE INVENTION

The present invention relates to an organic substance decomposition catalyst used for decomposing an organic substance and an organic substance decomposition apparatus including the organic substance decomposition catalyst.

BACKGROUND OF THE INVENTION

At present, organic substance decomposition catalysts used for decomposing organic substances are known.

Patent Document 1 describes an organic substance decomposition catalyst containing a perovskite-type complex oxide denoted by a general formula $ABO_3$ in which an A site includes Ba, a B site includes Zr, and part of Zr is substituted with at least one of Mn, Co, and Ni. It is understood that the organic substance decomposition catalyst does not contain an expensive noble metal and has high activity and excellent heat resistance.

Patent Document 1: Japanese Patent No. 6303834

SUMMARY OF THE INVENTION

The organic substance decomposition catalyst described in Patent Document 1 has high activity. However, there is still room to further improve the activity.

The present invention addresses the above-described issue and is intended to provide an organic substance decomposition catalyst having further improved activity and an organic substance decomposition apparatus including such an organic substance decomposition catalyst.

An organic substance decomposition catalyst according to the present invention is an organic substance decomposition catalyst used for decomposing an organic substance and that contains a perovskite-type complex oxide denoted by a formula $A_xB_yM_zO_w$ in which A includes Ba, B includes Zr, M represents Mn and Co, a composition ratio of Mn to Co is represented by Mn:Co=$z1$:$z2$, $z=z1+z2$, $y+z=1.000$, $0.100 \leq z1+z2 \leq 0.200$, $0.00 < z1/(z1+z2) < 0.75$, and w represents a positive value satisfying electrical neutrality.

Preferably, x, y, and z satisfy the relationship $1.000 \leq x/(y+z) \leq 1.050$.

Preferably, $z1$ and $z2$ satisfy the relationship $0.25 \leq z1/(z1+z2) \leq 0.50$.

An organic substance decomposition apparatus according to the present invention includes the above-described organic substance decomposition catalyst.

According to the organic substance decomposition catalyst of the present invention, the activity can be further improved.

In addition, the organic substance decomposition apparatus according to the present invention includes the organic substance decomposition catalyst that can further improve the activity and, therefore, can decompose an organic substance with a higher decomposition rate.

DETAILED DESCRIPTION OF THE PREFERRED EMBODIMENTS

Figure 1:
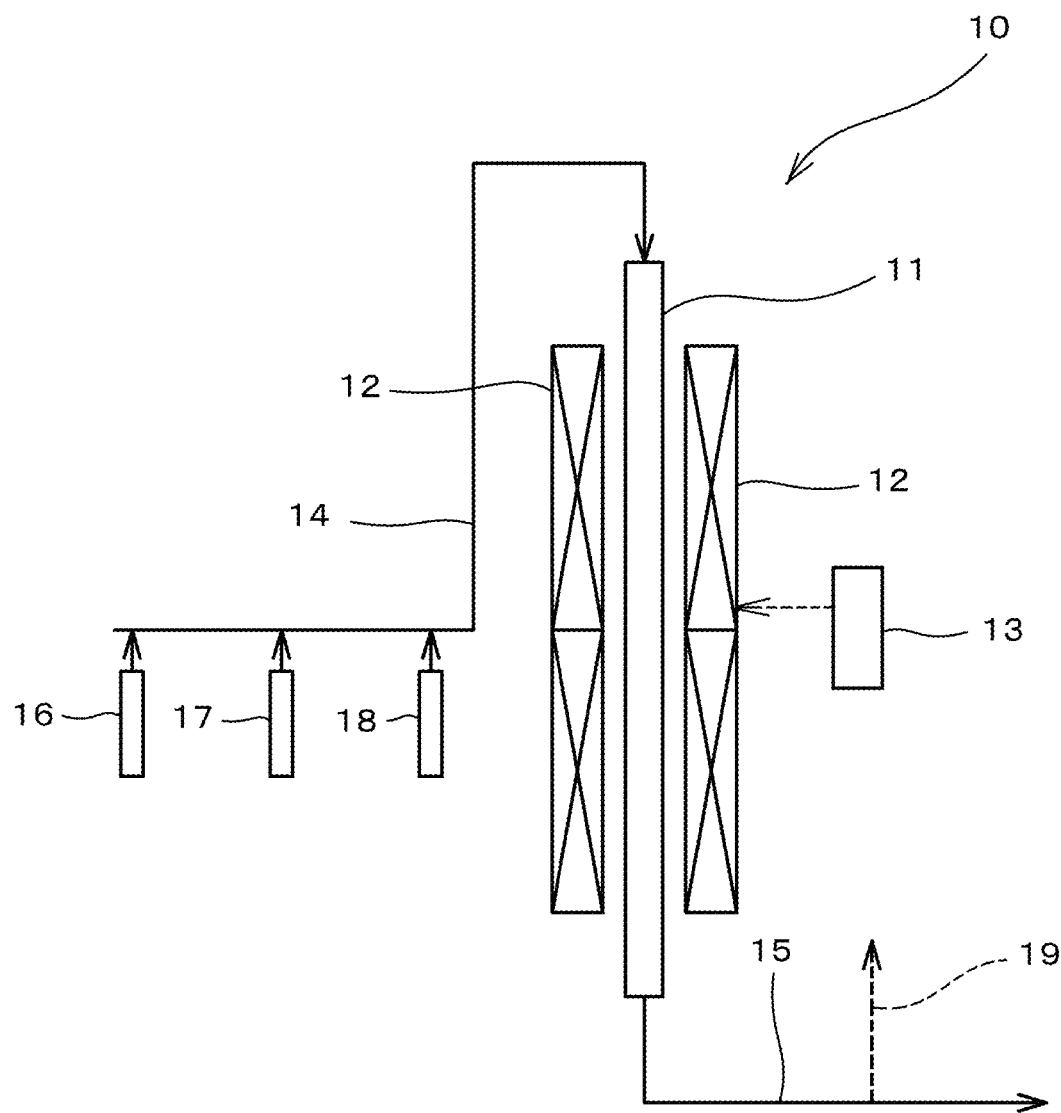
FIG. 1 is a schematic diagram illustrating the configuration of a test apparatus used for a test to evaluate the organic substance decomposition performance of an organic substance decomposition catalyst.

The embodiment according to the present invention will be described below so as to specifically explain the feature of the present invention.

An organic substance decomposition catalyst according to the present invention is an organic substance decomposition catalyst used for decomposing an organic substance and contains a perovskite-type complex oxide denoted by a formula $A_xB_yM_zO_w$ in which A includes Ba, B includes Zr, and M represents Mn and Co, a composition ratio of Mn to Co is represented by Mn:Co=$z1$:$z2$, $z=z1+z2$, $y+z=1.000$, $0.100 \leq z1+z2 \leq 0.200$, $0.00 < z1/(z1+z2) < 0.75$, and w represents a positive value satisfying electrical neutrality. In this regard, B and M in the general formula $A_xB_yM_zO_w$ occupy crystallographically equivalent positions, and the general formula can be represented by $A_x(B_yM_z)O_w$.

As described later, the organic substance decomposition catalyst of the present invention has higher activity than the organic substance decomposition catalyst in the related art and can further improve the decomposition rate of an organic substance. The organic substance decomposition catalyst can be used for various applications to decompose organic substances, for example, purification of exhaust gas from factories and automobiles. In such an instance, an organic substance decomposition apparatus including the organic substance decomposition catalyst satisfying the requirements of the present invention can be formed.

EXAMPLES

Powders of high purity $BaCO_3$, $ZrO_2$, $MnCO_3$, and $Co_3O_4$ having the composition described in Table 1 were weighed, pure water was added, and wet-mixing was performed with $ZrO_2$ pebbles so as to obtain a slurry. The resulting slurry was dried at 120° C. by using a drier. Thereafter, the resulting green powder mixture was heat-treated at a predetermined temperature of 1,100° C. to 1,150° C. for 2 hours so as to obtain a predetermined perovskite-type complex oxide.

Subsequently, an organic binder and pure water were added to the perovskite-type complex oxide, and wet-mixing was performed with $ZrO_2$ pebbles so as to obtain a slurry. The resulting slurry was dried at 120° C. by using a drier, pulverized into the shape of a powder, and formed into cylindrical pellets having a diameter of 8.5 mm and a thickness of 8 mm by using a press-molding machine. The resulting formed material was fired at a predetermined temperature of 1,000° C. to 1,100° C. for 2 hours. Thereafter, the resulting fired material was ground with a mortar and classified so as to obtain the organic substance decomposition catalysts of sample Nos. 1 to 26 in Table 1. Each organic substance decomposition catalyst had a granular shape with a diameter of 0.5 mm to 0.6 mm.

TABLE 1

| Sample No. | Charge composition ratio | | | | | | Firing temperature (° C.) | Toluene decomposition rate (%) | Specific surface area ($m^2/g$) | Integral width (°) |
|---|---|---|---|---|---|---|---|---|---|---|
| | Ba(x) | Zr(y) | Mn(z1) | Co(z2) | z1/(z1 + z2) | x/(y + z) | | | | |
| 1* | 1.000 | 0.900 | 0.100 | 0.000 | 1.00 | 1.00 | 1100 | 98.5 | 11.7 | 0.903 |
| 2* | 1.000 | 0.900 | 0.075 | 0.025 | 0.75 | 1.00 | 1100 | 99.4 | 10.3 | 0.837 |
| 3 | 1.000 | 0.900 | 0.070 | 0.030 | 0.70 | 1.00 | 1100 | 99.5 | 10.1 | 0.816 |
| 4 | 1.000 | 0.900 | 0.050 | 0.050 | 0.50 | 1.00 | 1100 | 99.7 | 9.5 | 0.754 |
| 5 | 1.000 | 0.900 | 0.025 | 0.075 | 0.25 | 1.00 | 1100 | 99.8 | 8.4 | 0.653 |
| 6 | 1.000 | 0.900 | 0.010 | 0.090 | 0.10 | 1.00 | 1100 | 99.5 | 7.2 | 0.622 |
| 7* | 1.000 | 0.900 | 0.000 | 0.100 | 0.00 | 1.00 | 1100 | 99.2 | 7.1 | 0.607 |
| 8* | 1.000 | 0.800 | 0.200 | 0.000 | 1.00 | 1.00 | 1100 | 99.1 | 9.8 | 0.984 |
| 9* | 1.000 | 0.800 | 0.150 | 0.050 | 0.75 | 1.00 | 1100 | 99.4 | 8.5 | 0.969 |
| 10 | 1.000 | 0.800 | 0.100 | 0.100 | 0.50 | 1.00 | 1100 | 99.9 | 7.2 | 0.957 |
| 11 | 1.000 | 0.800 | 0.050 | 0.150 | 0.25 | 1.00 | 1100 | 99.9 | 7.3 | 0.821 |
| 12* | 1.000 | 0.800 | 0.000 | 0.200 | 0.00 | 1.00 | 1100 | 99.4 | 5.6 | 0.694 |
| 13* | 1.000 | 0.900 | 0.100 | 0.000 | 1.00 | 1.00 | 1000 | 99.0 | 13.3 | 0.954 |
| 14* | 1.000 | 0.900 | 0.075 | 0.025 | 0.75 | 1.00 | 1000 | 99.4 | 12.3 | 0.933 |
| 15 | 1.000 | 0.900 | 0.050 | 0.050 | 0.50 | 1.00 | 1000 | 99.8 | 11.6 | 0.903 |
| 16 | 1.000 | 0.900 | 0.025 | 0.075 | 0.25 | 1.00 | 1000 | 99.9 | 10.7 | 0.812 |
| 17* | 1.000 | 0.900 | 0.000 | 0.100 | 0.00 | 1.00 | 1000 | 99.4 | 10.3 | 0.072 |
| 18* | 1.000 | 0.800 | 0.200 | 0.000 | 1.00 | 1.00 | 1000 | 99.3 | 11.0 | 1.043 |
| 19* | 1.000 | 0.800 | 0.150 | 0.050 | 0.75 | 1.00 | 1000 | 99.4 | 9.0 | 1.022 |
| 20 | 1.000 | 0.800 | 0.100 | 0.100 | 0.50 | 1.00 | 1000 | 99.8 | 9.2 | 1.003 |
| 21 | 1.000 | 0.800 | 0.050 | 0.150 | 0.25 | 1.00 | 1000 | 99.9 | 9.0 | 0.977 |
| 22* | 1.000 | 0.800 | 0.000 | 0.200 | 0.00 | 1.00 | 1000 | 99.4 | 7.0 | 0.835 |
| 23* | 0.990 | 0.900 | 0.000 | 0.100 | 0.00 | 0.99 | 1000 | 98.9 | 5.9 | 0.542 |
| 24 | 1.030 | 0.900 | 0.050 | 0.050 | 0.50 | 1.03 | 1100 | 99.9 | 10.0 | 0.984 |
| 25 | 1.050 | 0.900 | 0.050 | 0.050 | 0.50 | 1.05 | 1100 | 99.8 | 12.1 | 0.902 |
| 26* | 1.060 | 0.900 | 0.075 | 0.025 | 0.75 | 1.06 | 1100 | 99.2 | 8.8 | 0.784 |

In Table 1, sample numbers not marked with an asterisk indicate samples satisfying the above-described requirements of the present invention. On the other hand, sample numbers marked with an asterisk indicate samples not satisfying the requirements of the present invention.

Herein, the organic substance decomposition catalyst of sample No. 5 in Table 1 was finely ground with a mortar, and the resulting powder was subjected to composition analysis by X-ray fluorescence analysis (XRF analysis). In this regard, quantitative analysis was performed by using a fundamental parameter method. In the quantitative analysis, the powder obtained in the above-described step of producing the perovskite-type complex oxide to produce the organic substance decomposition catalyst of sample No. 5, that is, the powder obtained by drying the slurry by using the drier was used as a standard sample. The result of the composition analysis is described in Table 2.

TABLE 2

| Sample No. | XRF analysis result | | | |
|---|---|---|---|---|
| | Ba(x) | Zr(y) | Mn(z1) | Co(z2) |
| 5 | 1.000 | 0.900 | 0.025 | 0.075 |

As is clear from Table 2, the organic substance decomposition catalyst having the predetermined composition was obtained.

Activity Evaluation Method (1) Test Apparatus

FIG. 1 is a schematic diagram illustrating the configuration of a test apparatus 10 used for a test to evaluate the organic substance decomposition performance of an organic substance decomposition catalyst. The test apparatus 10 includes a reaction pipe 11 through which an organic substance passes, a heating portion 12 to heat the organic substance passing through the reaction pipe 11, and a control portion 13 to control the heating portion 12.

The sample (organic substance decomposition catalyst) produced by using the above-described method is disposed in a region that is a central portion inside the reaction pipe 11 and that is heated by the heating portion 12. The control portion 13 is configured to enable the temperature of the region heated by the heating portion 12 to be controlled.

A gas feed pipe 14 is connected to the upstream side of the reaction pipe 11. The gas feed pipe 14 is connected to a toluene feed line 16 to feed toluene (organic substance), a nitrogen feed line 17 to feed nitrogen ($N_2$), and an oxygen feed line 18 to feed oxygen ($O_2$). That is, a treatment object gas containing toluene, nitrogen, and oxygen is fed to the reaction pipe 11 through the gas feed pipe 14.

A gas discharge pipe 15 to discharge a treated gas after the organic substance is decomposed to outside the system is connected to the downstream side of the reaction pipe 11. A sampling line 19 to sample the treated gas is connected to the gas discharge pipe 15 and is configured to enable the toluene concentration in the treated gas to be analyzed by using a gas chromatograph.

(2) Testing Method

The test apparatus 10 was used, and a test in which the treatment object gas containing toluene, nitrogen, and oxygen was continuously fed to the reaction pipe 11 and toluene was decomposed was performed. The composition of the treatment object gas was set to be toluene ($C_7H_8$): 50 ppm, nitrogen ($N_2$): 80%, and oxygen ($O_2$): 20%, the space velocity SV was set to be 150,000/h, and the catalyst temperature was set to be 300° C.

The treated gas was sampled at the outlet of the sampling line 19, and the toluene concentration was quantified by the analysis in which the gas chromatograph was used. Subsequently, the resulting toluene concentration was used, and the toluene decomposition rate was determined based on formula (1) below. In this regard, "50" in formula (1) is the concentration of toluene contained in the treatment object gas before treatment.

$$\text{toluene decomposition rate (\%)} = 100 - 100 \times (\text{toluene concentration}/50) \quad (1)$$

Measurement of Specific Surface Area

A specific surface area analyzer "Macsorb model-1201" produced by Mountech Co., Ltd. was used, and the specific surface area (SSA) of the resulting organic substance decomposition catalyst was measured. During the measurement of the specific surface area, the deaeration condition was set to be 400° C. for 20 min.

Measurement of Integral Width by X-Ray Diffraction

The resulting organic substance decomposition catalyst was finely ground with a mortar. Thereafter, X-ray diffraction measurement was performed by using an X-ray diffraction apparatus "D8 ADVANCE" produced by BRUKER, and the integral width of the peak intensity of the (222) face of the organic substance decomposition catalyst was measured.

Table 3 describes the data in Table 1 sorted in descending order of the toluene decomposition rate.

TABLE 3

| Sample No. | Charge composition ratio | | | | $z1/(z1+z2)$ | $x/(y+z)$ | Firing temperature (° C.) | Toluene decomposition rate (%) | Specific surface area ($m^2/g$) | Integral width (°) |
|---|---|---|---|---|---|---|---|---|---|---|
| | Ba(x) | Zr(y) | Mn(z1) | Co(z2) | | | | | | |
| 10 | 1.000 | 0.800 | 0.100 | 0.100 | 0.50 | 1.00 | 1100 | 99.9 | 7.2 | 0.957 |
| 11 | 1.000 | 0.800 | 0.050 | 0.150 | 0.25 | 1.00 | 1100 | 99.9 | 7.3 | 0.821 |
| 16 | 1.000 | 0.900 | 0.025 | 0.075 | 0.25 | 1.00 | 1000 | 99.9 | 10.7 | 0.812 |
| 21 | 1.000 | 0.800 | 0.050 | 0.150 | 0.25 | 1.00 | 1000 | 99.9 | 9.0 | 0.977 |
| 24 | 1.030 | 0.900 | 0.050 | 0.050 | 0.50 | 1.03 | 1100 | 99.9 | 10.0 | 0.984 |
| 5 | 1.000 | 0.900 | 0.025 | 0.075 | 0.25 | 1.00 | 1100 | 99.8 | 8.4 | 0.653 |
| 20 | 1.000 | 0.800 | 0.100 | 0.100 | 0.50 | 1.00 | 1000 | 99.8 | 9.2 | 1.003 |
| 15 | 1.000 | 0.900 | 0.050 | 0.050 | 0.50 | 1.00 | 1000 | 99.8 | 11.6 | 0.903 |
| 25 | 1.050 | 0.900 | 0.050 | 0.050 | 0.50 | 1.05 | 1100 | 99.8 | 12.1 | 0.902 |
| 4 | 1.000 | 0.900 | 0.050 | 0.050 | 0.50 | 1.00 | 1100 | 99.7 | 9.5 | 0.754 |
| 3 | 1.000 | 0.900 | 0.070 | 0.030 | 0.70 | 1.00 | 1100 | 99.5 | 10.1 | 0.816 |
| 6 | 1.000 | 0.900 | 0.010 | 0.090 | 0.10 | 1.00 | 1100 | 99.5 | 7.2 | 0.622 |
| 2* | 1.000 | 0.900 | 0.075 | 0.025 | 0.75 | 1.00 | 1100 | 99.4 | 10.3 | 0.837 |
| 9* | 1.000 | 0.800 | 0.150 | 0.050 | 0.75 | 1.00 | 1100 | 99.4 | 8.5 | 0.969 |
| 12* | 1.000 | 0.800 | 0.000 | 0.200 | 0.00 | 1.00 | 1100 | 99.4 | 5.6 | 0.694 |
| 14* | 1.000 | 0.900 | 0.075 | 0.025 | 0.75 | 1.00 | 1000 | 99.4 | 12.3 | 0.933 |
| 17* | 1.000 | 0.900 | 0.000 | 0.100 | 0.00 | 1.00 | 1000 | 99.4 | 10.3 | 0.072 |
| 19* | 1.000 | 0.800 | 0.150 | 0.050 | 0.75 | 1.00 | 1000 | 99.4 | 9.0 | 1.022 |
| 22* | 1.000 | 0.800 | 0.000 | 0.200 | 0.00 | 1.00 | 1000 | 99.4 | 7.0 | 0.835 |
| 18* | 1.000 | 0.800 | 0.200 | 0.000 | 1.00 | 1.00 | 1000 | 99.3 | 11.0 | 1.043 |
| 7* | 1.000 | 0.900 | 0.000 | 0.100 | 0.00 | 1.00 | 1100 | 99.2 | 7.1 | 0.607 |
| 26* | 1.060 | 0.900 | 0.075 | 0.025 | 0.75 | 1.06 | 1100 | 99.2 | 8.8 | 0.784 |
| 8* | 1.000 | 0.800 | 0.200 | 0.000 | 1.00 | 1.00 | 1100 | 99.1 | 9.8 | 0.984 |
| 13* | 1.000 | 0.900 | 0.100 | 0.000 | 1.00 | 1.00 | 1000 | 99.0 | 13.3 | 0.954 |
| 23* | 0.990 | 0.900 | 0.000 | 0.100 | 0.00 | 0.99 | 1000 | 98.9 | 5.9 | 0.542 |
| 1* | 1.000 | 0.900 | 0.100 | 0.000 | 1.00 | 1.00 | 1100 | 98.5 | 11.7 | 0.903 |

Table 1 and Table 3 describe the catalyst composition, $z1/(z1+z2)$, $x/(y+z)$, the firing temperature, the toluene decomposition rate, the specific surface area, and the integral width. In this regard, a smaller value of the integral width indicates better crystallinity.

The organic substance decomposition catalysts of sample Nos. 1 to 7 are samples with the firing temperature of 1,100° C., z ($=z1+z2$)=0.100, the value of z1 being different from each other, and the value of z2 being different from each other. The organic substance decomposition catalysts of sample Nos. 8 to 12 are samples with the firing temperature of 1,100° C., z ($=z1+z2$)=0.200, the value of z1 being different from each other, and the value of z2 being different from each other. The organic substance decomposition catalysts of sample Nos. 13 to 17 are samples with the firing temperature of 1,000° C., z (=z1+z2)=0.100, the value of z1 being different from each other, and the value of z2 being different from each other. The organic substance decomposition catalysts of sample Nos. 18 to 22 are samples with the firing temperature of 1,000° C., z (=z1+z2)=0.200, the value of z1 being different from each other, and the value of z2 being different from each other.

The organic substance decomposition catalyst of sample No. 23 is a sample with the firing temperature of 1,000° C., the molar ratio (x/(y+z)) of less than 1.00, z1 of 0.000, and z2 of 0.100. The organic substance decomposition catalysts of sample Nos. 24 and 25 are samples with the firing temperature of 1,100° C., the molar ratio (x/(y+z)) of more than 1 and 1.05 or less, the values of z1 and z2 of 0.050. The organic substance decomposition catalyst of sample No. 26 is a sample with the firing temperature of 1,100° C., the molar ratio (x/(y+z)) of more than 1, z1 of 0.075, and z2 of 0.025.

As described in Table 1 and Table 3, the toluene decomposition rate of the organic substance decomposition catalyst satisfying the requirements of the present invention was 99.5% or more. On the other hand, the toluene decomposition rate of the organic substance decomposition catalyst not satisfying the requirements of the present invention in the related art was 99.4% or less.

That is, the organic substance decomposition catalyst satisfying the requirements of the present invention has high activity and can improve the decomposition rate of organic substance compared with the organic substance decomposition catalyst in the related art. The organic substance decomposition catalyst may be required to have high organic substance decomposition rate in accordance with the usage environment. The organic substance decomposition catalyst satisfying the requirements of the present invention can be used even in an environment in which the organic substance decomposition rate of 99.5% or more is required.

In this regard, the data of z1+z2 described in Table 1 and Table 3 are just 0.100 and 0.200. However, the activity of the organic substance decomposition catalyst in the range of 0.100 z1+z2 0.200 is also high.

As described in Table 1 and Table 3, the organic substance decomposition catalyst satisfying the requirements of the present invention satisfies the relationship, $1.000 \leq x/(y+z) \leq 1.050$. Therefore, it is preferable that x, y, and z satisfy the relationship, $1.000 \leq x/(y+z) \leq 1.050$.

In this regard, the toluene decomposition rates of the organic substance decomposition catalysts of sample Nos. 4, 5, 10, 11, 15, 16, 20, 21, 24, and 25 in which z1/(z1+z2) which satisfied the relationship, $0.25 \leq z1/(z1+z2) \leq 0.50$, were further high numerical value of toluene decomposition rate of 99.7% or more. Therefore, it is preferable that the organic substance decomposition catalyst satisfy the relationship, $0.25 \leq z1/(z1+z2) \leq 0.50$.

Herein, as is clear from comparisons of the toluene decomposition rate of the organic substance decomposition catalyst between sample No. 1 and sample No. 7, between sample No. 8 and sample No. 12, between sample No. 13 and sample No. 17, and between sample No. 18 and sample No. 22, regarding the perovskite-type complex oxide denoted by a general formula $A_xB_yM_zO_w$, the configuration in which M represents Co has a high toluene decomposition rate and high activity compared with the configuration in which M represents Mn. However, when the Co content increases, the integral width decreases, and the specific surface area also decreases so that sintering tends to be facilitated.

Figure 2:
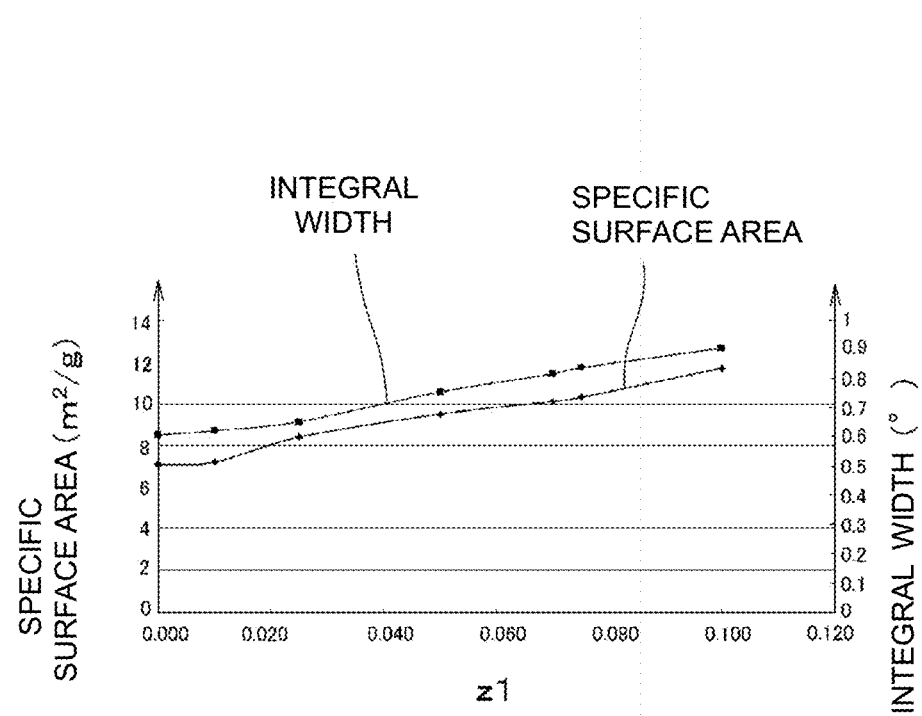
FIG. 2 is a diagram illustrating the relationship between the amount of Mn contained in the organic substance decomposition catalyst of sample Nos. 1 to 7 and the specific surface area and the relationship between the amount of Mn and the integral width.

FIG. 2 is a diagram illustrating the relationship between the amount of Mn contained in the organic substance decomposition catalyst of sample Nos. 1 to 7 and the specific surface area and the relationship between the amount of Mn and the integral width. As described above, the organic substance decomposition catalysts of sample Nos. 1 to 7 are samples with z (=z1+z2)=0.100 and the value of z1 (Mn content) being different from each other. As illustrated in FIG. 2, the integral width is decreased and the specific surface area is reduced with reduced z1 and with reduced amount of Mn, that is, with increased amount of Co.

That is, an effect of increasing active points in accordance with an increase in the Co content has a trade-off relationship with activity reduction due to facilitation of sintering in accordance with an increase in the Co content. The organic substance decomposition catalyst according to the present invention can realize high activity by setting the composition ratio of Mn to Co (Mn:Co=z1:z2) to be in an appropriate range, specifically, in a range in which the relationship, $0.00 < z1/(z1+z2) < 0.75$, is satisfied.

Figure 3:
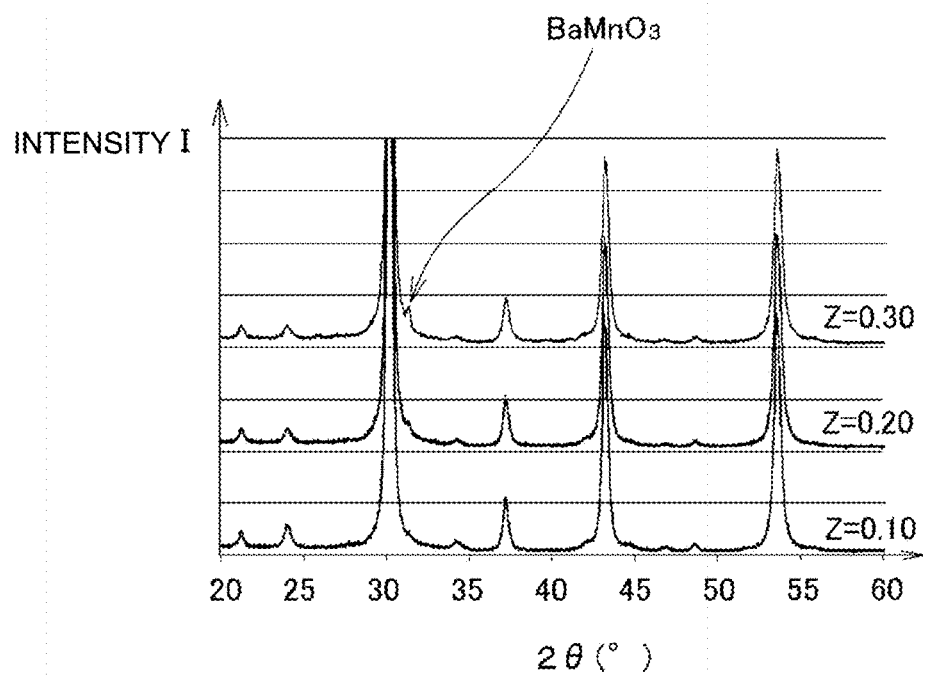
FIG. 3 is a diagram illustrating X-ray diffraction patterns obtained by X-ray diffraction measurement of three types of organic substance decomposition catalysts in which z is set to be 0.1, 0.2, or 0.3.

FIG. 3 is a diagram illustrating X-ray diffraction patterns obtained by X-ray diffraction measurement of three types of organic substance decomposition catalysts in which z (=z1+z2) above is set to be 0.1, 0.2, or 0.3. As illustrated in FIG. 3, when z=0.3, it was ascertained that another crystal, $BaMnO_3$, having low activity was generated.

Figure 4:
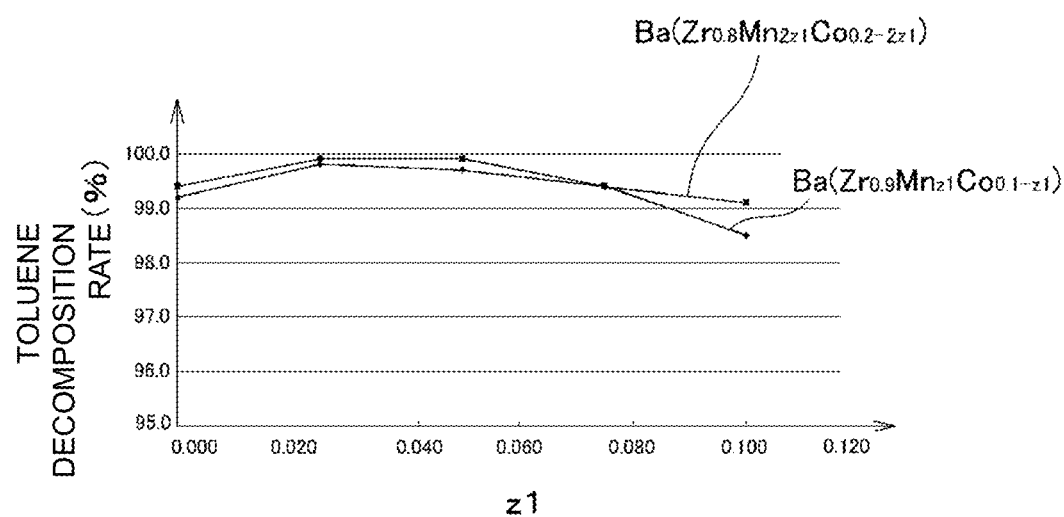
FIG. 4 is a diagram illustrating the relationship between $z1$ of an organic substance decomposition catalyst in which $z=0.1$ or $z=0.2$ and the toluene decomposition rate.

FIG. 4 is a diagram illustrating the relationship between z1 of the organic substance decomposition catalyst in which z=0.1 or z=0.2 and the toluene decomposition rate. The organic substance decomposition catalyst in which z=0.1 is denoted by $Ba(Zr_{0.9}Mn_{z1}Co_{0.1-z1})$, and the organic substance decomposition catalyst in which z=0.2 is denoted by $Ba(Zr_{0.8}Mn_{z1}Co_{0.2-z1})$. As illustrated in FIG. 4, there is not a large difference between the toluene decomposition rate when z=0.1 and that when z=0.2.

Figure 5:
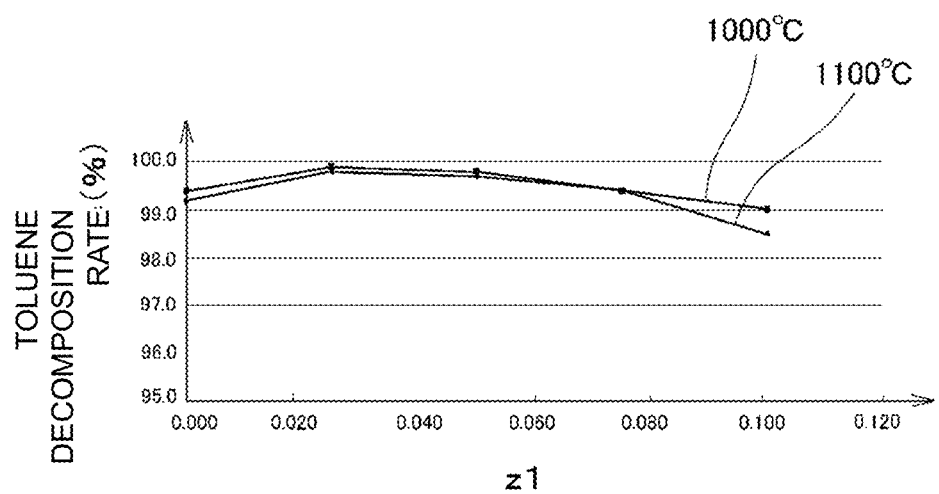
FIG. 5 is a diagram illustrating the relationship between $z1$ of an organic substance decomposition catalyst, the firing temperature of which is 1,100° C. or 1,000° C., and the toluene decomposition rate.

FIG. 5 is a diagram illustrating the relationship between z1 of the two types of organic substance decomposition catalysts, the firing temperature of which is 1,100° C. or 1,000° C., and the toluene decomposition rate. As described above, since the calcination temperature during production of the organic substance decomposition catalyst was set to be in the range of 1,100° C. to 1,150° C., it is obvious that the activity is reduced in accordance with a decrease in the specific surface area when firing is performed at a temperature higher than or equal to the above-described temperature. Therefore, a difference in the toluene decomposition rate between the firing temperature of 1,100° C. and 1,000° C. was examined. As illustrated in FIG. 5, the difference in the toluene decomposition rate caused due to a difference in the firing temperature is not so large.

The present invention is not limited to the above-described embodiment and may be variously applied and modified within the scope of the present invention.

In the above-described explanations, the examples in which toluene is decomposed by using the organic substance decomposition catalyst according to the present invention are described. However, the organic substance is not limited to toluene.

REFERENCE SIGNS LIST 10 test apparatus
11 reaction pipe
12 heating portion
13 control portion
14 gas feed pipe
15 gas discharge pipe 16 toluene feed line
17 nitrogen feed line
18 oxygen feed line
19 sampling line

The invention claimed is:

1. An organic substance decomposition catalyst used for decomposing an organic substance, the organic substance decomposition catalyst comprising:
a perovskite-type complex oxide denoted by a formula $A_xB_yM_zO_w$ in which
A includes Ba,
B includes Zr,
M represents Mn and Co,
a composition ratio of Mn to Co is represented by Mn:Co=z1:z2,
z=z1+z2,
y+z=1.000,
$0.100 < z1+z2 \leq 0.200$,
$0.00 < z1/(z1+z2) < 0.75$,
w represents a positive value satisfying electrical neutrality,
$1.000 \leq x/(y+z) \leq 1.050$,
the organic substance decomposition catalyst has a specific surface area of 7.2 m²/g or more, and
an integral width of the peak intensity of a (222) face of the organic substance decomposition catalyst in X-ray diffraction measurement is in a range of 0.622° or more.

2. The organic substance decomposition catalyst according to claim 1, wherein $0.25 \leq z1/(z1+z2) \leq 0.50$.

3. The organic substance decomposition catalyst according to claim 2, wherein the organic substance decomposition catalyst has a toluene decomposition rate of 99.7% or more.

4. The organic substance decomposition catalyst according to claim 1, wherein the organic substance decomposition catalyst has a toluene decomposition rate of 99.5% or more.

5. The organic substance decomposition catalyst according to claim 1, wherein the specific surface area is 7.2 to 12.1 m²/g.

6. The organic substance decomposition catalyst according to claim 1, wherein integral width of the peak intensity of the (222) face of the organic substance decomposition catalyst is in a range of 0.622° to 1.003°.

7. An organic substance decomposition apparatus comprising:
a reaction pipe through which an organic substance passes; and
the organic substance decomposition catalyst according to claim 1 disposed inside the reaction pipe.

8. The organic substance decomposition apparatus according to claim 7, wherein $0.25 \leq z1/(z1+z2) \leq 0.50$.

9. The organic substance decomposition apparatus according to claim 8, wherein the organic substance decomposition catalyst has a toluene decomposition rate of 99.7% or more.

10. The organic substance decomposition apparatus according to claim 7, wherein the organic substance decomposition catalyst has a toluene decomposition rate of 99.5% or more.

11. The organic substance decomposition apparatus according to claim 7, wherein the specific surface area is 7.2 to 12.1 m²/g.

12. The organic substance decomposition apparatus according to claim 7, wherein the integral width of the peak intensity of a (222) face of the organic substance decomposition catalyst is in a range of 0.622° to 1.003°.

* * * * *